United States Patent [19]
Eberly et al.

[11] Patent Number: 5,314,612
[45] Date of Patent: May 24, 1994

[54] FLUID CATALYTIC CRACKING PROCESS FOR PRODUCING LOW EMISSIONS FUELS

[75] Inventors: Paul E. Eberly; William E. Winter, both of Baton Rouge, La.

[73] Assignee: Exxon Research and Engineering Company, Florham Park, N.J.

[21] Appl. No.: 982,935

[22] Filed: Nov. 30, 1992

[51] Int. Cl.$^5$ .................. C10G 11/00; C10G 11/02
[52] U.S. Cl. ................... 208/120; 208/118; 208/113; 208/121; 208/122; 208/61; 208/85
[58] Field of Search ............ 208/57, 61, 85, 113, 208/118, 120, 120 MC, 121, 122

[56] References Cited

U.S. PATENT DOCUMENTS 4,740,292  4/1988  Chen et al. .................. 208/120
4,780,193  10/1988  Derr, Jr. et al. ............. 208/61

OTHER PUBLICATIONS

Avidan, "Recent and Future Developments in FCC", 1991, pp. 43–49.

Primary Examiner—R. Bruce Breneman
Assistant Examiner—Walter D. Griffin
Attorney, Agent, or Firm—Henry E. Naylor

[57] ABSTRACT

Disclosed is a fluid catalytic cracking process for producing low emissions fuels. The feedstock is exceptionally low in nitrogen and aromatics and relatively high in hydrogen. The catalyst is a mixture of zeolite Y and zeolite beta ($\beta$). The feedstock can be characterized as having less than about 50 wppm nitrogen; greater than about 13 wt. % hydrogen; less than about 7.5 wt. % 2+ ring aromatic cores; and not more than about 15 wt. % aromatic cores overall.

5 Claims, No Drawings

FLUID CATALYTIC CRACKING PROCESS FOR PRODUCING LOW EMISSIONS FUELS

FIELD OF THE INVENTION

The present invention relates to a fluid catalytic cracking process for producing low emissions fuels. The feedstock is exceptionally low in nitrogen and aromatics and relatively high in hydrogen. The catalyst is a mixture of zeolite Y and zeolite beta The feedstock can be characterized as having less than about 50 wppm nitrogen; greater than about 13 wt. % hydrogen; less than about 7.5 wt. % 2+ ring aromatic cores; and not more than about 15 wt. % aromatic cores overall.

BACKGROUND OF THE INVENTION

Catalytic cracking is an established and widely used process in the petroleum refining industry for converting petroleum oils of relatively high boiling point to more valuable lower boiling products, including gasoline and middle distillates, such as kerosene, jet fuel and heating oil. The preeminent catalytic cracking process now in use is the fluid catalytic cracking (FCC) process in which a preheated feed is brought into contact with a hot cracking catalyst which is in the form of a fine powder, typically having a particle size of about 10–300 microns, usually about 100 microns, for the desired cracking reactions to take place. During the cracking, coke and hydrocarbonaceous material are deposited on the catalyst particles. This results in a loss of catalyst activity and selectivity. The coked catalyst particles and associated hydrocarbon material are subjected to a stripping process, usually with steam, to remove as much of the hydrocarbon material as technically and economically feasible. The stripped particles, containing non-strippable coke, are removed from the stripper and sent to a regenerator where the coked catalyst particles are regenerated by being contacted with air, or a mixture of air and oxygen, at elevated temperature. This results in the combustion of the coke which is a strongly exothermic reaction which, besides removing the coke, serves to heat the catalyst to the temperatures appropriate for the endothermic cracking reaction. The process is carried out in an integrated unit comprising the cracking reactor, the stripper, the regenerator, and the appropriate ancillary equipment. The catalyst is continuously circulated from the reactor or reaction zone, to the stripper and then to the regenerator and back to the reactor. The circulation rate is typically adjusted relative to the feed rate of the oil to maintain a heat balanced operation in which the heat produced in the regenerator is sufficient for maintaining the cracking reaction with the circulating, regenerated catalyst being used as the heat transfer medium. Typical fluid catalytic cracking processes are described in the monograph Fluid Catalytic Cracking with Zeolite Catalysts, Venuto, P.B. and Habib, E. T., Marcel Dekker Inc. N.Y. 1979, which is incorporated wherein by reference. As described in this monograph, catalysts which are conventionally used are based on zeolites, especially the large pore synthetic faujasites, zeolites X and Y.

Typical feeds to a catalytic cracker can generally be characterized as being a relatively high boiling oil or residuum, either on its own, or mixed with other fractions, also usually of a relatively high boiling point. The most common feeds are gas oils, that is, high boiling, non-residual oils, with an initial boiling point usually above about 230° C., more commonly above about 350° C., with end points of up to about 620° C. Typical gas oils include straight run (atmospheric) gas oil, vacuum gas oil, and coker gas oil.

While such conventional fluid catalytic cracking processes are suitable for producing conventional transportation fuels, such fuels are generally unable to meet the more demanding requirements of low emissions fuels. To meet low emissions standards, the fuel products must be relatively low in sulfur, nitrogen, and aromatics, especially multiring aromatics. Conventional fluid catalytic cracking is unable to meet such standards. These standards will require either further changes in the FCC process, catalysts, or post-treating of all FCC products. Since post-treating to remove aromatics from gasoline or distillate fuels is particularly expensive, there are large incentives to limit the production of aromatics in the FCC process. Consequently, there exits a need in the art for methods of producing large quantities of low emissions transportation fuels, such as gasoline and distillates.

SUMMARY OF THE INVENTION

In accordance with the present invention, there is provided a fluid catalytic cracking process for producing low emissions fuel products, which process comprises:

(a) introducing a hydrocarbonaceous feedstock into a reaction zone of a catalytic cracking unit comprised of a reaction zone and a regeneration zone, which feedstock is characterized as having: a boiling point from about 230° C. to about 350° C., with end points up to about 620° C.; a nitrogen content less than about 50 wppm; a hydrogen content in excess of about 13 wt. %; a 2+ ring aromatic core content of less than about 7.5 wt. %; and an overall aromatic core content of less than about 15 wt. %;

(b) catalytically cracking said feedstock in said reaction zone at a temperature from about 450° C. to about 600° C., by causing the feedstock to be in contact with a cracking catalyst for a contact time of about 0.5 to 5 seconds, which cracking catalyst is a mixture of an effective amount of zeolite Y and zeolite $\beta$; thereby producing lower boiling products and catalyst particles having deposited thereon coke and hydrocarbonaceous material;

(c) stripping said spent catalyst in a stripping zone with a stripping medium thereby removing at least a portion of said hydrocarbonaceous material; and (d) recovering the stripped hydrocarbonaceous material from the stripping zone and passing the stripped spent catalyst to a regeneration zone; and (e) regenerating said coked catalyst in a regeneration zone by burning off a substantial amount of the coke on said catalyst, and optionally with an added fuel component, to maintain the regenerated catalyst at a temperature which will maintain the catalytic cracking reactor at a temperature from about 450° C. to about 600° C.; and (f) recycling said regenerated catalyst to the reaction zone.

In preferred embodiments of the present invention, an added fuel component is used in the regeneration zone and is selected from: $C_2$ light gases from the catalytic cracking unit, and natural gas.

In preferred embodiments of the present invention the catalyst mixture contains a weight ratio of zeolite Y to zeolite $\beta$ of about 1:9 to 9:1.

In other preferred embodiments of the present invention the contact time in the reaction zone is about 0.5 to 3 seconds.

DETAILED DESCRIPTION OF THE INVENTION

The practice of the present invention results in the production of less aromatic naphtha products as well as the production of more $C_3$ and $C_4$ olefins which can be converted to high octane, nonaromatic alkylates, such as methyl tertiary butyl ether.

Feedstocks which are suitable for being converted in accordance with the present invention are any of those hydrocarbonaceous feedstocks which are conventional feedstocks for fluid catalytic cracking and which have an initial boiling point of about 230° C. to about 350° C., with an end point up to about 620° C. The feedstocks of the present invention must also contain no more than about 50 wppm nitrogen, no more than about 7.5 wt. % 2+ ring aromatic cores, no more than about 15 wt. % aromatic cores overall, and at least about 13 wt. % hydrogen. Non-limiting examples of such feeds include the non-residual petroleum based oils such as straight run (atmospheric) gas oil, vacuum gas oil, and coker gas oil. Other oils may also be used, such as those from synthetic sources which are normally liquid or solid, such as coal and oil-shale, and which may be catalytically cracked, either on their own or in admixture with oils of petroleum origin. Such oils from synthetic sources will typically be comprised of a mixture of aromatics, paraffins, and cyclic paraffins. Feedstocks which are suitable for use in the practice of the present invention may not be readily available in a refinery. This is because typical refinery streams in the boiling point range of interest, and which are conventionally used for fluid catalytic cracking, generally contain too high a content of undesirable components such as nitrogen, sulfur, and aromatics. Consequently, such streams will need to be upgraded, or treated, to lower the level of such undesirable components. Non-limiting methods for upgrading such streams include hydrotreating in the presence of hydrogen and a supported Mo containing catalyst with Ni and/or Co; extraction methods, including solvent extraction as well as the use of solid absorbents, such as various molecular sieves. It is preferred to hydrotreat the streams.

Any suitable conventional hydrotreating process can be used as long as it results in a stream having the characteristics of nitrogen, sulfur, and aromatics level as previously mentioned. That is nitrogen levels of less than about 50 wppm, preferably less than about 30 wppm, more preferably less than about 15 wppm, and most preferably less than about 5 wppm; a hydrogen content of greater than about 13 wt. %, preferably greater than about 13.5 wt. %; a 2+ ring aromatic core content of less than about 7.5 wt. %, preferably less than about 4 wt. %; and an overall aromatic core content of less than about 15 wt. %, preferably less than about 8 wt. %.

Suitable hydrotreating catalysts are those which are typically comprised of a Group VIB metal (according to Sargent-Welch Scientific Company) with one or more Group VIII metals as promoters, on a refractory support. It is preferred that the Group VIB metal be molybdenum or tungsten, more preferably molybdenum. Nickel and cobalt are the preferred Group VIII metals with alumina being the preferred support. The Group VIII metal is present in an amount ranging from about 2 to 20 wt. %, expressed as the metal oxides, preferably from about 4 to 12 wt. %. The Group VIB metal is present in an amount ranging from about 5 to 50 wt. %, preferably from about 10 to 40 wt. %, and more preferably from about 20 to 30 wt. %. All metals weight percents are based on the total weight of the catalyst. Any suitable refractory support can be used. Such supports are typically inorganic oxides, such as alumina, silica, silica-alumina, titania, and the like. Preferred is alumina.

Suitable hydrotreating conditions include temperatures ranging from about 250° to 450° C., preferably from about 350° C. to 400° C.; pressures from about 250 to 3000 psig; preferably from about 1500 to 2500 psig; hourly space velocities from about 0.05 to 6 V/V/Hr; and a hydrogen gas rate of about 500 to 10000 SCF/B; where SCF/B means standard cubic feet per barrel, and V/V/HR means volume of feed per volume of the catalyst per hour.

A hydrocarbonaceous feedstock which meets the aforementioned requirements for producing a low emissions fuel is fed to a conventional fluid catalytic cracking unit. The catalytic cracking process may be carried out in a fixed bed, moving bed, ebullated bed, slurry, transfer line (dispersed phase) riser, or dense bed fluidized bed operation. It is preferred that the catalytic cracking unit be a fluid catalytic cracking unit. Such a unit will typically contain a reactor where the hydrocarbonaceous feedstock is brought into contact with hot powdered catalyst particles which were heated in a regenerator. Transfer lines connect the two vessels for moving catalyst particles back and forth. The cracking reaction will preferably be carried out at a temperature from about 450° to about 680° C., more preferably from about 480° to about 560° C.; pressures from about 5 to 60 psig, more preferably from about 5 to 40 psig; contact times (catalyst in contact with feed) of about 0.5 to 10 seconds, more preferably about 1 to 6 seconds; and a catalyst to oil ratio of about 0.5 to 15, more preferably from about 2 to 8. During the cracking reaction, lower boiling products are formed and some hydrocarbonaceous material, and non-volatile coke, are deposited on the catalyst particles. The hydrocarbonaceous material is removed by use of a stripping medium, preferably steam. The non-volatile coke is typically comprised of highly condensed aromatic hydrocarbons which generally contain about 4 to 10 wt. % hydrogen. As hydrocarbonaceous material and coke build up on the catalyst, the activity of the catalyst for cracking, and the selectivity of the catalyst for producing gasoline blending stock, is diminished. The catalyst particles can recover a major proportion of their original capabilities by removal of most of the hydrocarbonaceous material by stripping and the coke by a suitable oxidative regeneration process. Consequently, the catalyst particles are sent to a stripper and then to a regenerator.

Catalyst regeneration is accomplished by burning the coke deposits from the catalyst surface with an oxygen-containing gas, such as air. Catalyst temperatures during regeneration may range from about 560° C. to about 760° C. The regenerated, hot catalyst particles are then transferred back to the reactor via a transfer line and, because of their heat, are able to maintain the reactor at the temperature necessary for the cracking reactions. Coke burn-off is an exothermic reaction, therefore in a conventional fluid catalytic cracking unit with conventional feeds, no additional fuel needs to be added. The feedstocks used in the practice of the present invention, primarily because of their low levels of aromatics, and also due to the relatively short contact times in the reactor or transfer line, may not deposit enough coke on the catalyst particles to achieve the necessary temperatures in the regenerator. Therefore, it may be necessary to use an additional fuel to provide increased temperatures in the regenerator so the catalyst particles returning to the reactor are hot enough to maintain the cracking reactions. Non-limiting examples of suitable additional fuel include $C^-_2$ gases from the catalytic cracking process itself; natural gas; and any other non-residual petroleum refinery stream in the appropriate boiling range. Such additional fuels are sometimes referred to as torch oils. Preferred are the $C^-_2$ gases.

Catalysts suitable for use in the present invention consist of a combination of zeolite Y and zeolite beta combined in a matrix comprised of silica, silica-alumina, alumina, or any other suitable matrix material for such catalysts. The zeolite portion of the resulting composite catalyst will consist of 25 to 95 wt. % zeolite Y with the balance being zeolite beta. The catalysts may also contain clay as a filler to provide a structurally strong particle. Zeolite Y is a well known zeolite material used in a variety of currently available catalysts. It can be used in a variety of ion-exchanged forms, including the rare-earth, hydrogen, and USY (ultrastable-Y) form. Preferably, the unit cell size will range from about 24.21 Å to 24.40 Å after equilibration in the catalytic cracking unit. More preferably, the unit cell size will be less than about 24.25 Å.

Zeolite beta has been described in U.S. Pat. No. 3,308,069 which is incorporated herein by reference. The framework of zeolite beta has been described by Higgins et al in ZEOLITES, 1988, Vol. 8, November, pages 446-452. Zeolite beta can be readily synthesized in modifications having silica to alumina ratios of 25 to 75. It consists of tetrahedral framework disordered along [001]. It can be characterized by three mutually intersecting 12-ring channel systems permitting adsorption of larger hydrocarbon molecules such as those which enter the channel system in zeolite Y. The zeolite Y and zeolite beta can exist together in the same catalyst particle or on a different catalyst particle. In the latter case, control of the relative amounts of zeolite Y and zeolite beta in the commercial fluid catalytic cracking unit can be more successfully accomplished by changing, starting, or stopping the addition of the separate zeolite Y and zeolite beta containing components.

The particle size of the zeolite may range from about 0.1 to 10 microns, preferably from about 0.3 to 3 microns. The zeolite will be mixed with a suitable porous matrix material when used as a catalyst for fluid catalytic cracking. Non-limiting porous matrix materials which may be used in the practice of the present invention include alumina, alumina-boria, silica-alumina, silica-magnesia, silica-zirconia, silicathoria, silica-beryllia, silica-titania, as well as ternary compositions, such as silica-alumina-thoria, silica-alumina-zirconia, magnesia and silica-magnesia-zirconia. The matrix may also be in the form of a cogel. The relative proportions of zeolite component and inorganic oxide gel matrix on an anhydrous basis may vary widely with the zeolite content, ranging from about 10 to 99, more usually from about 10 to 80, percent by weight of the dry composite. The matrix itself may possess catalytic properties, generally of an acidic nature.

Generally, the particle size of the total catalyst will range from about 10 to 300 microns in diameter, with an average particle diameter of about 60 microns. The surface area of the matrix material will be about $\leq 350$ m²/g, preferably 50 to 200 m²/g, more preferably from about 50 to 100 m²/g. While the surface area of the final catalysts will be dependent on such things as type and amount of zeolite material used, it will usually be less than about 500 m²/g, preferably from about 50 to 300 m²/g, more preferably from about 50 to 250 m²/g, and most preferably from about 100 to 250 m²/g.

The following examples are Presented to illustrate the present invention and should not be taken as being limiting in any way.

EXAMPLE 1 (Comparative)

Cracking tests were conducted in the small fixed bed microactivity test (MAT) unit. Such a test Unit is described in the Oil and Gas Journal, 1966 Vol.64, pages 7, 84, 85 and Nov. 22, 1971, pages 60-68, which is incorporated herein by reference. These tests do not represent this invention and the results are disclosed for comparison with more favorable results disclosed in Example 3 below. Run conditions selected are listed as follows:

| | |
|---|---|
| Temperature, °C. | 425 |
| Run Time, Sec. | 30 |
| Catalyst Charge, g | 4.1 |
| Amount Feed, cc. | 1.1 |
| Catalyst/Oil ratio | 4.2 to 4.5 |

Two catalysts were used in these tests. The first (Catalyst ZA) was a fresh, steamed, commercially available catalyst containing a partially rare earth exchanged zeolite Y (ADZ-30 from Davison) and in a silica sol and clay binder. Catalyst ZA has an intermediate unit cell size after steaming, or commercial deactivation. Tests were also made with a fresh, steamed catalyst which contains about 40% zeolite beta in a silica sol/clay matrix. This catalyst is designated as Catalyst ZB. Catalysts ZA and ZB were steamed 16 hours at 760° C. to simulate commercially deactivated catalysts. Runs were made with each catalyst and with mixtures of the two catalysts in various proportions.

| Catalyst/Additive | ZA | ZB |
|---|---|---|
| Wt. % | | |
| Al₂O₃ | 8.80 | 21.0 |
| SiO₂ | 69.04 | 79.0 |
| RE₂O₃ | 1.87 | 0.0 |
| Na₂O | 0.57 | 0.06 |
| Calc. 4 hrs @ 540° C. | | |
| S.A., m²/g | 381 | 355.7 |
| P.V., cc/g | 0.426 | 0.483 |
| Unit Cell, Å | 24.49 | n/a |
| Stmd 16 hrs @ 760° C. | | |
| S.A., m²/g | 240 | 169.5 |
| P.V., cc/g | 0.313 | 0.358 |
| Unit Cell, Å | 24.30 | n/a |

The feed used for these experiments was a conventional 340°–540° C. fluid catalytic cracking feedstock obtained from a commercial refinery. It is not a clean feed as defined in this invention. It is designated Feedstock RB.

| Feed "RB" Properties | |
|---|---|
| Wppm N | 633 |

| Feed "RB" Properties | |
|---|---|
| Wt % S | 1.15 |
| Wt % C | 86.51 |
| Wt % H | 12.23 |
| % Sats. | 54.7 |
| % 1R —Arom | 18.7 |
| % Tot. Cores | 14.9 |
| % 2 + R Cores | 11.5 |

The total liquid product from the MAT tests amounting to about 0.3 to 0.7 grams was analyzed on a gas chromatograph (GC) instrument. This instrument provided a boiling point distribution determined by gas chromatographic distillation (GCD) to evaluate (1) the amount of material boiling less than 15° C., (2) naphtha between 15° C. and 220° C., (3) light cat cycle oil (LCCO) between 220° C. and 345° C., and (4) the bottoms boiling above 345° C.

Detailed cracking data are given in Table I below.

TABLE I

| wt. % Catalyst ZA | 100 | 90 | 75 | 50 | 0 |
|---|---|---|---|---|---|
| wt. % Catalyst ZB | 0 | 10 | 25 | 50 | 100 |
| Conversion (220° C.) | 78.0 | 75.8 | 75.3 | 73.4 | 62.7 |
| Yields, Wt % | | | | | |
| Coke | 5.6 | 4.8 | 4.0 | 3.7 | 2.8 |
| $C_2^-$ Dry Gas | 3.0 | 2.9 | 2.7 | 2.3 | 2.0 |
| $C_3H_6$ | 3.1 | 4.6 | 5.2 | 5.4 | 7.1 |
| $C_3H_8$ | 1.6 | 1.7 | 1.6 | 1.3 | 1.0 |
| $C_4H_8$ | 3.0 | 4.0 | 4.5 | 5.2 | 9.4 |
| Iso-$C_4H_{10}$ | 5.5 | 6.4 | 6.8 | 6.4 | 4.3 |
| N—$C_4H_{10}$ | 1.6 | 1.5 | 1.3 | 1.1 | 0.7 |
| 15-220° C. | 54.6 | 50.0 | 49.2 | 48.1 | 35.4 |
| LCCO | 14.5 | 14.3 | 14.4 | 14.7 | 12.4 |
| Bottoms | 7.5 | 9.9 | 10.4 | 11.9 | 24.9 |
| $C_2$-$C_4$ Olefins | 7.0 | 9.6 | 10.5 | 11.4 | 17.2 |
| Saturated Gases | 10.7 | 11.4 | 11.5 | 10.2 | 7.3 |

With this conventional feed and intermediate unit cell size catalyst, Conversion to 220° C.− products decreased steadily as the proportion of catalyst ZB was increased. Although the zeolite beta additive does boost light olefins production, these olefins are obtained at the expense of lower conversion to 345° C.− products.

EXAMPLE 2 (Comparative)

Cracking tests were conducted with another conventional feed in the same MAT testing unit and using the same operating conditions as described in Example 1 above. These tests do not representative of the present invention and were made to compare with the results obtained in Example 3 below.

Two catalysts were used in these tests. The first was a fresh, steamed, commercially available catalyst (Octacat from Davison) which is designated as catalyst ZO. Catalyst ZO contains a USY zeolite but no rare earths. It is formulated in a silica-sol matrix. It is a low unit cell size catalyst, after steaming, or commercial deactivation. The second catalyst was a zeolite beta containing catalyst (ZB) which was described in Example 1. Catalysts ZO and ZB were steamed 16 hours at 760° C. to simulate commercial deactivation. Runs were made with each catalyst and with mixtures of the two catalysts in various proportions. Catalyst ZO had the following properties:

| Catalyst | ZO |
|---|---|
| Wt. % | |
| $Al_2O_3$ | 26.0 |
| $SiO_2$ | 73.0 |
| $RE_2O_3$ | 0.02 |
| $Na_2O$ | 0.25 |
| Calc. 4 hrs @ 540° C. | |
| S.A., $m^2/g$ | 297.5 |
| P.V., cc/g | 0.24 |
| Unit Cell, Å | 24.44 |
| Stmd 16 hrs @ 760° C. | |
| S.A., $m^2/g$ | 199.5 |
| P.V., cc/g | 0.20 |
| Unit Cell, Å | 24.25 |

The feed for these tests was a the 345° C.+ fraction of raw Arab light vacuum gas oil (VGO). This is a conventional fluid catalytic cracking feed and is designated at RA and the 345° C.+ fraction of RA is designated RA+. Properties of feed prior to distillation are given in the table below.

| Feed "RA" Properties | |
|---|---|
| Wppm N | 675 |
| Wt % S | 2.31 |
| Wt % C | 86.33 |
| Wt % H | 12.10 |
| Wt % 345° C.+ | 96.9 |

The total liquid product from these tests was analyzed using the procedures described in Example 1 above. Detailed cracking data are given in Table II below for tests made with conventional VGO feed RA, a relatively low unit cell size USY catalyst, and a zeolite beta containing catalyst.

TABLE II

| wt. % Catalyst ZO | 100 | 80 | 40 | 0 |
|---|---|---|---|---|
| wt. % Catalyst ZB | 0 | 20 | 60 | 100 |
| Conversion (220° C.) | 67.1 | 68.1 | 70.5 | 68.7 |
| Yields, Wt % | | | | |
| Coke | 2.4 | 3.7 | 3.8 | 5.0 |
| $C_2^-$ Dry Gas | 2.2 | 2.6 | 3.1 | 3.4 |
| $C_3H_6$ | 4.7 | 5.9 | 7.3 | 8.8 |
| $C_3H_8$ | 1.0 | 1.4 | 1.7 | 2.1 |
| $C_4H_8$ | 5.9 | 6.4 | 8.1 | 9.7 |
| Iso-$C_4H_{10}$ | 4.2 | 4.8 | 5.4 | 5.1 |
| N—$C_4H_{10}$ | 0.9 | 0.9 | 0.9 | 1.0 |
| 15-220° C. Naphtha | 45.9 | 42.4 | 40.1 | 33.5 |
| LCCO | 15.6 | 16.8 | 15.2 | 12.9 |
| Bottoms | 17.3 | 15.2 | 14.3 | 18.5 |
| $C_2$-$C_4$ Olefins | 11.5 | 13.2 | 16.5 | 19.7 |
| Saturated Gases | 7.4 | 8.5 | 9.9 | 10.3 |

The zeolite beta containing catalyst was just as active for converting conventional feed RA+ as was the USY containing catalyst ZO. Consequently, conversion activities for the two catalyst blends of ZB and ZO were essentially the same as well. Catalyst ZB did provide higher light olefins yields at the expense of 15°-220° C. naphtha. On the other hand, the zeolite beta containing catalyst ZB boosted coke yields, which would result in lower conversions in a commercial heat balanced unit with conventional feed RA+.

EXAMPLE 3

Cracking tests were conducted in the same MAT testing unit and the same operating conditions described in Example 1 above. The same catalysts described in Example 2 was used for these tests.

The feed for these tests was the 345° C.+ fraction of an Arab Light VGO, hydrotreated at 2000 psig hydrogen and 380° C. with Ketjen's KF-840, a commercially available NiMo/alumina catalyst. The hydrotreated feed is designated by HA and the 345° C.+ fraction of HA is designated HA+. Properties of feed prior to distillation are given in the table below.

| Feed "HA" Properties | |
| --- | --- |
| Wppm N | 40 |
| Wt % S | 0.056 |
| Wt % C | 86.53 |
| Wt % H | 13.41 |
| Wt % 345° C.+ | 81.5 |

Detailed cracking data are given in Table III below for cracking the hydrotreated Arab Light VGO feed with low unit cell size USY and zeolite beta containing catalysts.

TABLE III

| wt. % Catalyst ZO | 100 | 80 | 40 | 0 |
| --- | --- | --- | --- | --- |
| wt. % Catalyst ZB | 0 | 20 | 60 | 100 |
| Conversion (220° C.) | 86.9 | 89.9 | 94.4 | 78.9 |
| Yields, Wt % | | | | |
| Coke | 2.0 | 1.9 | 1.6 | 1.2 |
| $C_2^-$ Dry Gas | 2.1 | 1.6 | 1.6 | 1.6 |
| $C_3H_6$ | 6.4 | 7.1 | 9.0 | 9.2 |
| $C_3H_8$ | 1.4 | 1.2 | 1.1 | 1.1 |
| $C_4H_8$ | 5.4 | 8.4 | 11.2 | 10.6 |
| Iso-$C_4H_{10}$ | 6.8 | 8.5 | 8.3 | 7.9 |
| N—$C_4H_{10}$ | 1.0 | 1.1 | 1.3 | 1.3 |
| 15-220° C. Naphtha | 61.7 | 60.2 | 60.3 | 46.0 |
| LCCO | 9.8 | 7.7 | 5.5 | 6.2 |
| Bottoms | 3.4 | 2.3 | 0.2 | 14.9 |
| $C_2$-$C_4$ Olefins | 12.8 | 16.2 | 20.9 | 20.5 |
| Saturated Gases | 10.4 | 12.4 | 12.3 | 11.9 |

The above data show that mixtures of USY and zeolite beta containing catalysts provide higher conversions than use of either catalyst alone. Further, conversions obtained with clean feed HA are relatively high with use of catalyst ZO alone so that the higher conversion obtained with the 40% ZO/60% ZB mixture is unexpected, particularly in view of the lower conversions obtained with use of catalyst ZB alone. Another difference between these results and results obtained with conventional feed RA+, is that catalyst ZB and mixtures of catalysts ZB and ZO produced less coke from the clean feed than with catalyst ZO alone. As seen in Example 2 above, the zeolite beta containing catalyst boosted coke yields from feed RA+. Catalyst ZB also boosted light olefins yields from clean feed HA+ without boosting dry gas, light catalytic cycle oil, or bottoms yields.

These results, along with results disclosed in Examples 1 and 2 above, evidence that the combination of zeolite beta and USY has more impact with a clean than with a conventional fluid catalytic cracking feed.

EXAMPLE 4 (Comparative)

Cracking tests were conducted in the same MAT testing unit described in Example 1 above. The same catalysts and feed which were described in Example 2 above was used for these tests. Operating conditions were the same as the operating conditions used in Example 1 above except that the feed and catalyst weights were set to provide a catalyst to oil ratio of about 6 to provide comparative data at higher conversions.

In addition to the GCD analysis obtained in previous examples, another portion of liquid product was analyzed on a PIONA instrument which is a multidimensional gas chromatograph (using several columns) to determine the molecular types according to carbon number from $C_3$ to $C_{11}$. The types include normal paraffins, isoparaffins, naphthenes, normal olefins, iso-olefins, cyclo-olefins, and aromatics.

Detailed cracking data are given in Table IV below for experiments with conventional feed RA and Catalysts ZB and ZO.

TABLE IV

| wt. % Catalyst ZO | 100 | 40 |
| --- | --- | --- |
| wt. % Catalyst ZB | 0 | 60 |
| Conversion (220° C.) | 72.7 | 74.0 |
| Yields, Wt % | | |
| Coke | 4.4 | 5.1 |
| $C_2^-$ Dry Gas | 3.2 | 3.7 |
| $C_3H_6$ | 6.3 | 8.9 |
| $C_3H_8$ | 1.8 | 2.2 |
| $C_4H_8$ | 6.0 | 8.2 |
| Iso-$C_4H_{10}$ | 6.0 | 6.8 |
| N—$C_4H_{10}$ | 1.2 | 1.3 |
| 15-220° C. Naphtha | 43.9 | 37.6 |
| LCCO | 16.4 | 14.9 |
| Bottoms | 10.8 | 11.1 |
| 15-220° C. Naphtha | | |
| Aromatics | 35.6 | 41.5 |
| Olefins | 16.6 | 20.2 |

These results show about the same conversion for the catalyst mixture containing catalyst ZB vs catalyst ZO alone. Light olefins yields were boosted by the additive at the expense of naphtha. Catalyst ZB also boosted coke yields. However, the critical result shown above is that the catalyst mixture containing zeolite beta produced a more aromatic, more olefinic catalytic naphtha than catalyst ZO alone.

EXAMPLE 5 (Comparative)

Further cracking tests were conducted at the same conditions and in the same MAT testing unit as described in Example 1 above. The catalyst used for these experiments was a Catalysts ZO which was described in Example 2. This example does not represent this invention and is provided for comparison.

The 345° C.+ fractions of hydrotreated Arab Light VGO products were used as feeds for these catalytic cracking experiments. Feed for the hydrotreating experiments was the same raw feed described in Example 2. Hydrotreating conditions ranged from 1200 to 2000 psig hydrogen, 700° to 720° F., and 0.15 to 1.5 LHSV. Ketjen's KF-843, a commercially available NiMo/alumina catalyst was used to hydrotreat the feeds. The hydrotreated feeds are designated by HA followed by a number indicating hydrotreating severity which increases from HA5+ to HA1+.

| Properties of Hydrotreated Arab LVGO's | | | |
| --- | --- | --- | --- |
| | HA5+ | HA3+ | HA1+ |
| Wppm N | 130 | 4 | <0.5 |
| Wt % S | 0.08 | <0.01 | <0.01 |
| Wt % C | 86.90 | 86.44 | 85.70 |
| Wt % H | 13.10 | 13.56 | 14.30 |
| % Sats. | 62.3 | 79.9 | 95.7 |
| % 1R —Arom | 27.8 | 15.7 | 2.3 |
| % Tot. Cores | 11.3 | 6.4 | 1.3 |
| % 2 + R Cores | 6.3 | 3.2 | 1.0 |

Both GCD and PIONA analyses were obtained for these tests. Detailed cracking data are given in Table V below for a catalyst to oil ratio of 4.

TABLE V

| Feed | HA5+ | HA3+ | HA1+ |
|---|---|---|---|
| Conversion (220° C.) | 79.4 | 87.0 | 96.0 |
| Yields, Wt % | | | |
| Coke | 2.1 | 1.6 | 1.8 |
| $C_2^-$ Dry Gas | 2.1 | 2.0 | 1.7 |
| $C_3H_6$ | 6.1 | 6.7 | 9.9 |
| $C_3H_8$ | 1.1 | 1.1 | 1.4 |
| $C_4H_8$ | 7.4 | 8.1 | 10.5 |
| Iso-$C_4H_{10}$ | 6.2 | 7.6 | 9.9 |
| N—$C_4H_{10}$ | 0.9 | 1.0 | 1.5 |
| 15-220° C. Naphtha | 53.5 | 58.8 | 59.3 |
| LCCO | 13.2 | 9.3 | 3.7 |
| Bottoms | 7.4 | 3.7 | 0.3 |
| 15-220° C. Naphtha | | | |
| Aromatics | 29.9 | 25.6 | 21.8 |
| Olefins | 20.2 | 21.2 | 21.7 |

Note that conversions obtained with the clean feeds at a catalyst to oil ratio of 4 were higher, particularly for the cleaner feeds HA3+ an HA1+, than conversions obtained with the conventional feed RA+ at the higher catalyst to oil ratio of 6. In addition, the naphthas produced from the clean feeds HA1, 2, 3+ were less aromatic than naphthas produced from the conventional feed RA+.

EXAMPLE 6

Further cracking tests were conducted in the MAT testing unit which was described in Example 1 above. Catalysts used for the experiments of this example were Catalysts ZO and ZB, both of which were described in Example 2 above. The same 345° C.+ fractions of hydrotreated Arab Light VGO products described in Example 5 were used as feeds for this example.

Test conditions, with the exception of catalyst to oil ratio, were the same as in Example 5. Catalyst and feed weights were modified in these experiments to provide a catalyst to oil ratio of about 3 vs a ratio of 4 which was used in the experiments described in Example 5. As in Examples 4 and 5, both GCD and PIONA analyses were obtained for these tests. Detailed cracking data are shown in Table VI below for catalyst to oil ratio of 3.

TABLE VI

| Feed | HA5+ | HA3+ | HA1+ |
|---|---|---|---|
| Conversion (220° C.) | 79.0 | 86.6 | 96.7 |
| Yields, Wt % | | | |
| Coke | 2.0 | 1.6 | 1.4 |
| Dry Gas | 2.0 | 1.7 | 1.9 |
| $C_3H_6$ | 7.6 | 9.1 | 12.7 |
| $C_3H_8$ | 1.3 | 1.3 | 2.0 |
| $C_4H_8$ | 8.6 | 9.9 | 14.0 |
| Iso-$C_4H_{10}$ | 6.1 | 7.4 | 10.9 |
| N—$C_4H_{10}$ | 0.9 | 1.0 | 1.4 |
| 15-220° C. Naphtha | 50.4 | 54.5 | 52.3 |
| LCCO | 12.3 | 8.5 | 2.8 |
| Bottoms | 8.7 | 4.9 | 0.5 |
| 15-220° C. Naphtha | | | |
| Aromatics | 24.9 | 22.0 | 19.0 |
| Olefins | 32.1 | 31.4 | 31.0 |

Comparing the results of these experiments with the data shown in Example 5 above, several items stand out. First, conversions obtained with the catalyst mixture of this example were essentially the same as conversions obtained at a higher catalyst to oil ratio of catalyst ZO alone. Second, using the zeolite beta containing catalyst ZB, boosted light olefins yields without increasing coke, dry gas, or bottoms yields. Naphtha yields were down somewhat. However, the naphtha produced with the mixture of catalysts ZB and ZO was less aromatic than naphthas produced by catalyst ZO alone.

These results support the conclusion disclosed in Examples 1 to 3 hereof, that mixtures of zeolite beta and USY containing cracking catalysts are more active for converting relatively clean fluid catalytic cracking feeds to lighter products than catalysts containing only USY as the zeolite. With conventional feeds, zeolite beta containing catalysts show little if any conversion advantage over catalysts containing only USY as the zeolite. Since these comparisons are made at essentially constant conversion, the less aromatic naphthas produced using a mixture of USY zeolite and zeolite beta represent a difference in fluid catalytic cracking selectivity. Mixtures containing zeolite beta are more selective for the production of less aromatic naphthas from the relatively clean fluid catalytic cracking feeds meeting the requirements of this invention. This reduction in naphtha aromatics was not observed with dirtier conventional feeds.

What is claimed is:

1. A fluid catalytic cracking process for producing low emissions fuel products, which process comprises:
   (a) introducing a hydrocarbonaceous feedstock into a reaction zone of a catalytic cracking unit comprised of a reaction zone and a regeneration zone, which feedstock is characterized as having: a boiling point from about 230° C. to about 350° C., with end points up to about 620° C.; a nitrogen content less than about 50 wppm; a hydrogen content in excess of about 13 wt. %; a 2+ ring aromatic core content of less than about 7.5 wt. %; and an overall aromatic core content of less than about 15 wt. %;
   (b) catalytically cracking said feedstock in said reaction zone at a temperature from about 450° C. to about 600° C., by causing the feedstock to be in contact with a cracking catalyst for a contact time of about 0.5 to 5 seconds, which cracking catalyst is a mixture of an effective amount of zeolite Y and zeolite beta; thereby producing lower boiling hydrocarbonaceous products and a partially coked catalyst; and
   (c) stripping said spent catalyst in a stripping zone with a stripping medium thereby removing at least a portion of said hydrocarbonaceous material; and
   (d) recovering the stripped hydrocarbonaceous material from the stripping zone and passing the stripped spent catalyst to a regeneration zone; and
   (e) regenerating said spent catalyst in the regeneration zone by burning off a substantial amount of the coke on said catalyst, and with any added fuel component, to maintain the regenerated catalyst at a temperature which will maintain the catalytic cracking reactor at a temperature from about 450° C. to about 600° C.; and
   (f) recycling said regenerated catalyst to the reaction zone.

2. The process of claim 1 wherein the zeolite portion of the catalyst contains from 25 wt. % to 95 wt. % zeolite which is iso-structural to zeolite Y with the balance being zeolite beta.

3. The process of claim 2 wherein the hydrocarbonaceous feedstock contains: less than about 20 wppm nitrogen, greater than about 13.5 wt. % hydrogen, less than about 4 wt. % of 2+ ring aromatic cores, and an overall aromatic core content of less than about 8 wt. %.

4. The process of claim 2 wherein the zeolite which is isostructural to zeolite Y is an ion-exchanged form of the zeolite.

5. The process of claim 3 wherein the unit cell size of the zeolite which is iso-structural to zeolite Y ranges from about 24.21 Å to about 24.40 Å.

* * * * *